US010386675B2

(12) United States Patent
Jiang et al.

(10) Patent No.: US 10,386,675 B2
(45) Date of Patent: Aug. 20, 2019

(54) DISPLAY PANEL AND DISPLAY APPARATUS

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Ni Jiang, Beijing (CN); Xi Xiang, Beijing (CN); Yuanming Feng, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 24 days.

(21) Appl. No.: 15/713,056

(22) Filed: Sep. 22, 2017

(65) Prior Publication Data

US 2018/0088414 A1    Mar. 29, 2018

(30) Foreign Application Priority Data

Sep. 26, 2016    (CN) .......................... 2016 1 0849792

(51) Int. Cl.
*G02F 1/1335*    (2006.01)

(52) U.S. Cl.
CPC .. *G02F 1/133602* (2013.01); *G02F 1/133528* (2013.01); *G02F 1/133553* (2013.01); *G02F 2203/09* (2013.01); *G09G 2300/0439* (2013.01)

(58) Field of Classification Search
CPC ......... G02F 1/133602; G02F 1/133528; G02F 1/133553; G02F 2203/09; G09G 2300/0439
See application file for complete search history.

(56) References Cited

U.S. PATENT DOCUMENTS 7,339,641 B2 *   3/2008   Zhu ................... G02F 1/133555
                                                    349/113
8,253,869 B2 *   8/2012   Matsushima ....... G02F 1/13338
                                                    349/113

(Continued)

FOREIGN PATENT DOCUMENTS

CN    1519616 A    8/2004
CN    1573426 A    2/2005

(Continued)

OTHER PUBLICATIONS

First Office Action dated Jan. 21, 2019 corresponding to Chinese application No. 201610849792.9.

*Primary Examiner* — Peter D McLoone

(74) *Attorney, Agent, or Firm* — Nath, Goldberg & Meyer; Joshua B. Goldberg; Daniel Bissing

(57) ABSTRACT

The present disclosure relates to the field of display technology, and particularly relates to a display panel and a display apparatus. The display panel comprises a backlight source and a display substrate, wherein the display substrate comprises a plurality of pixel regions each comprising a transmissive region and a reflective region, a first polarizer is provided in an area corresponding to the transmissive region and at a side proximal to the backlight source, the first polarizer extends within the transmissive region only; and a reflective unit is provided in an area corresponding to the reflective region and close to the backlight source, and the reflective unit and the first polarizer are substantially provided in a same layer.

11 Claims, 3 Drawing Sheets

(56) References Cited

U.S. PATENT DOCUMENTS

| | | | |
|---|---|---|---|
| 8,462,144 B2* | 6/2013 | Jepsen | G09G 3/3685 345/204 |
| 9,547,193 B2* | 1/2017 | Zhao | G02F 1/133555 |
| 9,733,513 B2* | 8/2017 | Wang | G02F 1/133555 |
| 9,904,131 B1* | 2/2018 | Xie | G02F 1/133528 |
| 2005/0117097 A1* | 6/2005 | Noguchi | G02F 1/133555 349/114 |
| 2007/0046869 A1* | 3/2007 | Lin | G02F 1/133753 349/114 |
| 2009/0002580 A1* | 1/2009 | Matsushima | G02F 1/13338 349/12 |
| 2010/0020054 A1* | 1/2010 | Jepsen | G09G 3/3685 345/208 |
| 2010/0225857 A1* | 9/2010 | Lu | G02F 1/133555 349/98 |
| 2011/0001690 A1* | 1/2011 | Mori | G09G 3/3655 345/87 |
| 2015/0029454 A1* | 1/2015 | Xie | G02F 1/133784 349/128 |
| 2015/0212369 A1* | 7/2015 | Zhao | G02F 1/133555 349/99 |
| 2015/0219794 A1* | 8/2015 | Choi | G02B 1/04 522/173 |
| 2016/0041427 A1* | 2/2016 | Wang | G02F 1/133555 349/96 |
| 2017/0045778 A1* | 2/2017 | Cheng | G02F 1/1362 |
| 2018/0039105 A1* | 2/2018 | Xie | G02F 1/133528 |

FOREIGN PATENT DOCUMENTS

| | | |
|---|---|---|
| CN | 101393346 A | 3/2009 |
| CN | 104603167 A | 5/2015 |
| CN | 104714336 A | 6/2015 |
| CN | 104730761 A | 6/2015 |
| CN | 104854487 | 8/2015 |
| CN | 105259707 A | 1/2016 |
| KR | 1020090128890 A | 12/2009 |

* cited by examiner

DISPLAY PANEL AND DISPLAY APPARATUS

CROSS-REFERENCE TO RELATED APPLICATION

This application claims priority to Chinese Patent Application No. 201610849792.9, filed on Sep. 26, 2016, the contents of which are incorporated by reference in the entirety.

TECHNICAL FIELD

The present disclosure relates to the field of display technology, and particularly relates to a display panel and a display apparatus.

BACKGROUND

With the development of display technology, flat display has gradually become the mainstream. Currently, liquid crystal display (LCD) is the most mature technology. Depending on utilization of light, current LCD apparatuses include transmissive type, reflective type, and transflective type.

In an existing transflective LCD panel, light emitted from a backlight source irradiates evenly into the entire display region. Light irradiating into a reflective region from the backlight source passes a polarizer outside an array substrate, then is reflected by a reflective layer, and finally reaches the backlight source after passing the polarizer outside the array substrate again to be reused. Assuming that the backlight source emits 100% of light, because the polarizer itself has a transmission of 45%, only 45% (i.e., 100%*45%) of light can reach the reflective layer after passing the polarizer for the first time; and after light reflected back by the reflective layer passes the polarizer for the second time, only about 20% (i.e., 45%*45%) of light can pass. It can be seen that since light goes through the polarizer twice, nearly 80% of the light emitted from the backlight source towards the reflective region is wasted, which reduces utilization of the light source and leads to increased power consumption of the display panel.

How to avoid loss of light caused by a polarizer, improve utilization of a light source and reduce power consumption of a display panel becomes a technical problem to be solved urgently in the field of display panels.

SUMMARY

In an aspect, the present disclosure provides a display panel, comprising a backlight source and a display substrate, wherein the display substrate comprises a plurality of pixel regions each comprising a transmissive region and a reflective region, a first polarizer is provided in an area corresponding to the transmissive region and at a side proximal to the backlight source, the first polarizer extends within the transmissive region only; and a reflective unit is provided in an area corresponding to the reflective region and close to the backlight source, and the reflective unit and the first polarizer are substantially provided in a same layer.

Optionally, the reflective unit comprises a reflective layer, and the reflective region of the display panel further comprises a supplementary layer provided at a side of the reflective layer distal to the backlight source.

Optionally, a substrate is provided at an outmost surface of the display substrate proximal to the backlight source, and the first polarizer is provided on a surface of the substrate distal to the backlight source and corresponding to the transmissive region; and a plurality of dots spaced apart from each other and protruding away from the backlight source are provided on an area of the substrate corresponding to the reflective region, the reflective layer is provided on surfaces of the dots distal to the backlight source, and the supplementary layer is provided on a surface of the reflective layer distal to the backlight source.

In another aspect, the present disclosure further provides a display panel comprising a backlight source and a display substrate, wherein the display substrate comprises a plurality of pixel regions each comprising a transmissive region and a reflective region, a first polarizer is provided in an area corresponding to the transmissive region and on a surface of the display substrate proximal to the backlight source, the first polarizer further extends to the reflective region to form a first auxiliary polarizer; a reflective unit is provided in an area corresponding to the reflective region and close to the backlight source, and the reflective unit and the first polarizer are substantially provided in a same layer, wherein a supplementary layer is provided in the reflective region and on a surface of the first auxiliary polarizer proximal to the backlight source; and the reflective unit comprises a first reflective layer and a second reflective layer, the first reflective layer being provided on a surface of the first auxiliary polarizer distal to the backlight source, and the second reflective layer being provided on a surface of the supplementary layer proximal to the backlight source.

Optionally, a plurality of dots spaced apart from each other and protruding away from the backlight source are provided oil a surface of the supplementary layer distal to the backlight source, and the first auxiliary polarizer is provided on surfaces of the dots distal to the backlight source.

Optionally, the first polarizer is an anisotropic film polarizer formed using an organic dye molecule having polarizing property or a coated film polarizer formed by adding a dichroic dye to a reactive liquid crystal having anisotropic property.

Optionally, the first polarizer is formed using a trisazo dye.

Optionally, the first polarizer is formed using a transfer plate or an inkjet printing process.

Optionally, the first polarizer is a nanowire grid polarizer.

Optionally, the first polarizer is formed using a nanoimprint technique.

Optionally, the reflective layer is formed using a material having reflecting property, and the material having reflecting property includes aluminum or silver.

Optionally, the display substrate further comprises a second polarizer attached to a surface of the display substrate distal to the backlight source.

In another aspect, the present disclosure further provides a display apparatus, comprising any one of the above display panels.

The transflective LCD panel of the present disclosure is particularly suitable for high-end intelligent mobile terminal products such as smart wearable devices.

REFERENCE NUMERALS

1—first substrate; 2—reflective region; 3—transmissive region; 4—supplementary layer; 5—dot; 6—first polarizer; 61—first auxiliary polarizer; 7—reflective layer; 71—first reflective layer; 72—second reflective layer; 8—liquid crystal layer; 9—color filter layer; 10—second substrate; 11—second polarizer; 12—backlight source; 13—inkjet plate; 14—inkjet hole.

DETAILED DESCRIPTION OF THE EMBODIMENTS

To enable those skilled in the art to better understand technical solutions of the present disclosure, a display panel and a display apparatus provided in the present disclosure are described in detail below in conjunction with the accompanying drawings and specific embodiments.

First Embodiment

The present embodiment provides a display panel, which makes full use of light emitted from a backlight source and wasted as being absorbed by a polarizer in a reflective region in the prior art, so that utilization of a backlight source can be greatly improved and power consumption of the display panel can be reduced.

Figure 1:
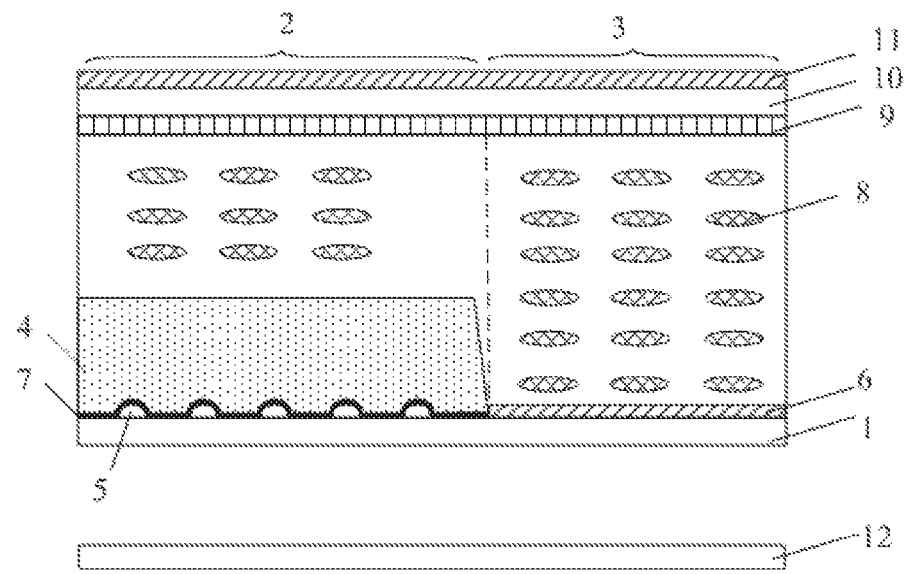
FIG. 1 is a structural schematic diagram of a display panel according to a first embodiment of the present disclosure.
Figure 2:
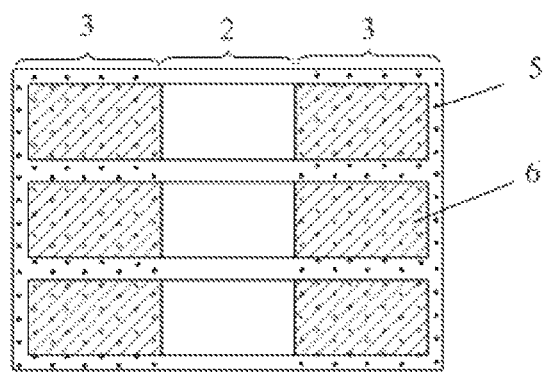
FIG. 2 is a schematic diagram illustrating reflective regions and transmissive regions in FIG. 1.

As shown in FIG. 1, the display panel includes a backlight source 12 and a display substrate, and the display substrate is divided into a plurality of pixel regions. As shown in FIG. 2, each pixel region includes a transmissive region 3 and a reflective region 2, wherein a first polarizer 6 is provided in an area corresponding to the transmissive region 3 and at a side of the display substrate proximal to the backlight source 12; a reflective unit is provided in an area corresponding to the reflective region 2 and close to the backlight source 12. The reflective unit and the first polarizer 6 are provided substantially in a same layer. The reflective unit in the present embodiment includes a reflective layer 7. In FIG. 1, the display panel includes a color filter substrate and an array substrate, the color filter substrate mainly includes a color filter film 9 for colorizing process, and the array substrate mainly includes thin film transistors (not shown in FIG. 1 because a thin film transistor covers a relative small area in the pixel region, and is generally distributed in the corner of the pixel region and not shown in a cross-sectional view) for controlling whether liquid crystals are light-transmissive.

Here, the reflective unit is configured to reflect light emitted from the backlight source 12 back to the backlight source side and reflect light from outside back to the outside. The above "substantially in a same layer" means that in the entire display substrate; the reflective unit and the first polarizer 6 have a same relative position with respect to a layer structure (e.g., a liquid crystal layer 8, a polarizer, etc. that can substantially change light. In the display panel of the present embodiment, incident light at at least one side of the reflective unit and the first polarizer 6 has same optical path characteristics.

In FIG. 1, a supplementary layer 4 is provided in the reflective region 2, and a surface of the supplementary layer 4 distal to the backlight source 12 is higher than a surface of the first polarizer 6 distal to the backlight source 12. The reflective layer 7 is provided on a surface of the supplementary layer 4 proximal to the backlight source 12. Here, the supplementary layer 4 serves as a compensating structure for optical path difference between the transmissive region 3 and the reflective region 2 such that external light that enters the reflective region 2 of the display substrate and goes into human eyes and light from the backlight source 12 that enters the transmissive region 3 of the display substrate and goes into human eyes have a same optical path.

A first substrate 1 is provided on an outermost surface of the display substrate proximal to the backlight source 12, the first polarizer 6 is provided on an surface of the first substrate 1 distal to the backlight source 12 and corresponding to the transmissive region 3; a plurality of dots 5 spaced apart from each other and protruding away from the backlight source 12 are provided on an area of the first substrate 1 corresponding to the transmissive region 3, the reflective layer 7 is provided on surfaces of the dots 5 distal to the backlight source 12, and the supplementary layer 4 is provided on a surface of the reflective layer 7 distal to the backlight source 12. That is, no polarizer is provided in the reflective region 2, the reflective layer 7 and the first polarizer 6 are provided to be co-planar, and incident light at the backlight source side has same optical path characteristics with respect to the reflective layer 7 and the first polarizer 6.

The reflective layer 7 is above the first substrate 1 having the dots 5, has an uneven surface due to the presence of the dots 5, and can scatter light irradiating thereon from outside, thereby achieving more uniform light distribution.

In the display panel, there are two types of polarizers that can work with liquid crystals to achieve conversion of linear polarization, namely, thin film polarizers, and nanowire grid polarizers. As a thin film polarizer, the first polarizer 6 is an anisotropic film polarizer formed by using an organic dye molecule having polarizing property or a coated film polarizer formed by adding a dichroic dye to a reactive liquid crystal having anisotropic property. Optionally, the first polarizer 6 is formed using a trisazo dye. Accordingly, the first polarizer 6 is formed by forming a thin film polarizer in the reflective region 2 of the display substrate using a transfer plate or an inkjet printing process.

Figure 3:
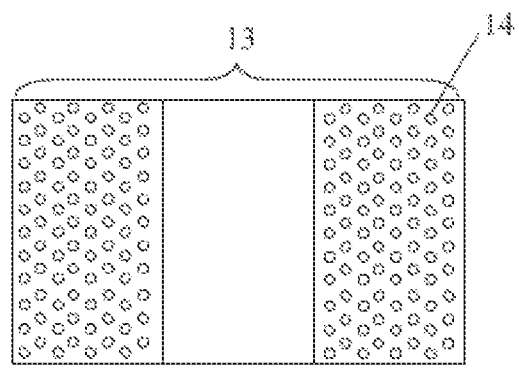
FIG. 3 is a schematic diagram of an inkjet plate for forming dots according to the first embodiment of the present disclosure.

Taking a case where a polarizing film is formed by an inkjet printing process, in order to prepare a structure with the first polarizer 6 in the transmissive region 3 and without polarizer in the reflective region 2 as shown in FIG. 1, as shown in FIG. 3, an inkjet plate 13 of an inkjet device is partially distributed with a plurality of inkjet holes 14 arranged densely, and each of the inkjet holes 14 can allow a certain amount of organic dye such as a trisazo dye to be ejected therethrough. The inkjet holes 14 are not distributed throughout the entire inkjet plate 13 and only distributed in an area corresponding to the transmissive region 3, so that a polarizing film is provided corresponding to the transmissive region 3 of the display substrate, and no polarizing film is formed in an area corresponding to the reflective region 2 of the display substrate.

Needless to say, the first polarizer 6 may also be a nanowire grid polarizer. Accordingly, the first polarizer 6 may be formed by forming a nanowire grid polarizer using a nanoimprint technique in the transmissive region 3 of the display substrate, which is not described in detail herein.

The first polarizer 6 formed by using any one of the above two ways can obtain a high yield and a good effect.

In the display panel of the present embodiment, the reflective layer 7 is formed using a material having reflecting property, and the material having reflecting property includes aluminum or silver.

It could be easily understood that in order that light passing through the liquid crystal layer 8 can normally exit, the display substrate further includes a second polarizer 11, which is attached to a surface of the display substrate distal to the backlight source 12. It can be seen from FIG. 1 that, the second polarizer 11 may be attached to an outer side of a second substrate 10, and in this case, the second polarizer 11 may be a conventional polarizer including a PVA film and a TAC film capable of generating polarized light.

Thus, according to FIG. 1, the display substrate in the present embodiment has a structure as follows.

In the reflective region 2, the first substrate 1 provided with the dots 5, the reflective layer 7, the supplementary layer 4, the liquid crystal layer 8, the color filter layer 9, the second substrate 10, and the second polarizer 11 are sequentially provided from bottom to top.

In the transmissive region 3; the first substrate 1, the first polarizer 6, the liquid crystal layer 8, the color filter layer 9, the second substrate 10, and the second polarizer 11 are sequentially provided from bottom to top.

Figure 4:
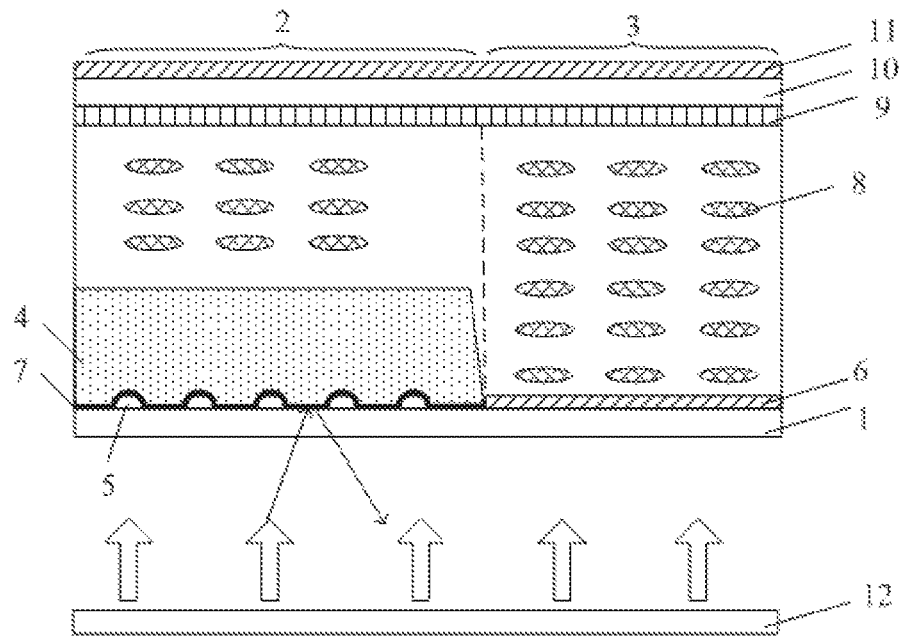
FIG. 4 is a schematic diagram illustrating a light path in the display panel according to the first embodiment of the present disclosure.

In the display panel in the present embodiment, as shown in an optical path diagram of FIG. 4, light emitted into the transmissive region 3 from the backlight source 12 directly enters the display substrate, and image display is finally implemented; external ambient light irradiating into the reflective region 2 is reflected by the reflective layer 7, and reflective image display can be implemented normally. Light emitted into the reflective region 2 from the backlight source 12 is reflected back to the backlight source side by the reflective layer 7 to be reused. In this way, most of the 80% of the light that is wasted as being absorbed by the polarizer in the prior art can be reused according to tests, thereby improving light efficiency and reducing power consumption of the display panel.

The present embodiment provides a transflective LCD panel, in which the first polarizer is provided in the transmissive region of each pixel region and no polarizer is provided in the reflective region, so that the light emitted from the backlight source and wasted in the reflective region in the prior art is effectively utilized, and in turn low power consumption of a transflective display panel product is realized, thereby enhancing product competitiveness.

Second Embodiment

The present embodiment provides a display panel, which can greatly improve utilization of a backlight source and reduce power consumption of the display panel. Compared with the first embodiment, the display panel in the present embodiment is provided with polarizers in both the transmissive regions and the reflective regions, and not only provided with a reflective layer under the supplementary layer, but also provided with a reflective layer on the supplementary layer.

Figure 5:
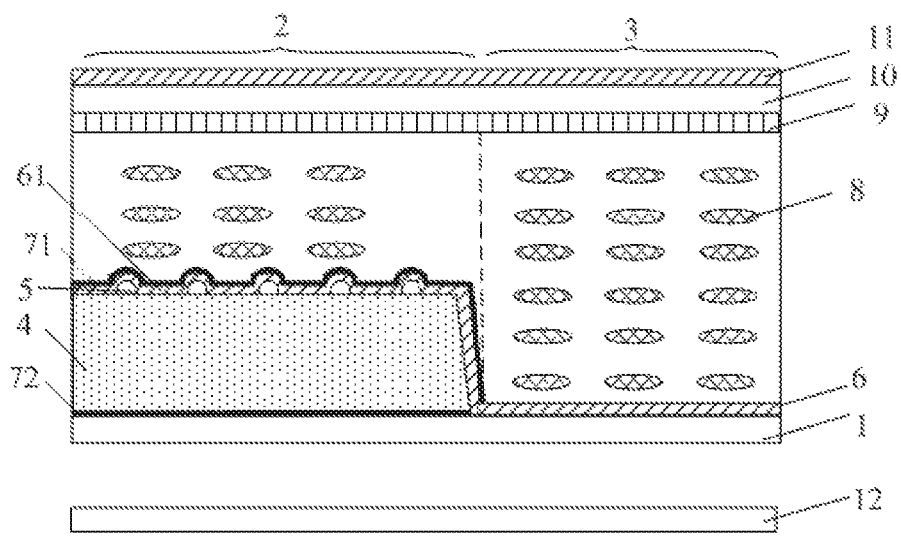
FIG. 5 is a structural schematic diagram of a display panel according to a second embodiment of the present disclosure.

As shown in FIG. 5, the first polarizer 6 of the display panel of the present embodiment further extends into the reflective region 2, the part of the first polarizer 6 in the reflective region 2 is also referred to as a first auxiliary polarizer 61, and the supplementary layer 4 in the reflective region 2 is provided on a surface of the first auxiliary polarizer 61 proximal to the backlight source 12. The reflective unit includes a first reflective layer 71 and a second reflective layer 72, the first reflective layer 71 is provided on a surface of the first auxiliary polarizer 61 distal to the backlight source 12, and the second reflective layer 72 is provided on a surface of the supplementary layer 4 proximal to the backlight source 12. In this case, the supplementary layer 4 only serves as a compensating structure for the optical path difference between the transmissive region 3 and the reflective region 2, and has no influence on external light due to the presence of the reflective layers provided thereon and thereunder. In addition, the first reflective layer 71 is provided on the first auxiliary polarizer 61, but because the second reflective layer 72 is further provided below the first auxiliary polarizer 61, both external light and light emitted from the backlight source 12 cannot reach the first auxiliary polarizer 61. Therefore, the first auxiliary polarizer 61 does not act on light, and causes no loss to the light. In the meanwhile, the entire reflective unit is provided such that it can be considered to be coplanar with the first polarizer 6, and the second reflective layer 72 and the first polarizer 6 are provided such that incident light at the backlight source side has same optical path characteristics with respect to the second reflective layer 72 and the first polarizer 6. In the pixel region of the display panel of the present embodiment, both the transmissive region 3 and the reflective region 2 are provided with the first polarizer, therefore, the entire first polarizer may be provided using a transfer plate, and the fabrication process is simple.

Here, a plurality of dots 5 spaced apart from each other and protruding away from the backlight source 12 are provided on a surface of the supplementary layer 4 distal to the backlight source 12, and the first auxiliary polarizer 61 are provided on surfaces of the dots 5 distal to the backlight source 12. The supplementary layer 4 and the dots 5 provided thereon may be formed in a same fabricating process using a same material such as a resin.

Like the first embodiment, the first polarizer 6 and the first auxiliary polarizer 61 in the display panel of the present embodiment may be film polarizers or nanowire grid polarizers. Specific material and preparing method of the first polarizer 6 and the first auxiliary polarizer 61 are the same as those of the first polarizer 6 of the display panel in the first embodiment, and are not described in detail herein.

Taking a case where a polarizing film is formed by an inkjet printing process, in order to prepare a structure with the polarizer in both the transmissive region 3 and the reflective region 2 as shown in FIG. 5, a plurality of inkjet holes 14, which are arranged densely, are distributed throughout an inkjet plate 13 of an inkjet device, and each of the inkjet holes 14 can allow a certain amount of organic dye such as a trisazo dye to be ejected therethrough. Because the inkjet holes 14 are distributed throughout the entire inkjet plate 13, a polarizing film is provided corresponding to both the transmissive region 3 and the reflective region 2. The polarizer provided at the backlight side in the present embodiment is provided in the entire pixel region, can thus be provided as a whole using a transfer plate, and the fabrication process is simple.

In the display panel of the present embodiment, the first reflective layer 71 and the second reflective layer 72 are formed using a material having reflecting property, and the material having reflecting property includes aluminum or silver.

Similarly, in order that light passing through a liquid crystal layer 8 can normally exit; the display substrate further includes a second polarizer 11, which is attached to a surface of the display substrate distal to the backlight source 12. It can be seen from FIG. 5 that, the second polarizer 11 may be attached to an outer side of the second substrate 10, and in this case, the second polarizer 11 may be a conventional polarizer including a PVA film and a TAC film capable of generating polarized light.

Thus, according to FIG. 5, the display substrate in the present embodiment has a structure as follows.

In the reflective region 2, the first substrate 1, the second reflective layer 72 the supplementary layer 4 provided with the dots 5, the first auxiliary polarizer 61, the first reflective layer 71, the liquid crystal layer 8, the color filter layer 9, the second substrate 10, and the second polarizer 11 are sequentially provided from bottom to top.

In the transmissive region 3, the first substrate 1, the first polarizer 6, the liquid crystal layer 8, the color filter layer 9, the second substrate 10, and the second polarizer 11 are sequentially provided from bottom to top.

Figure 6:
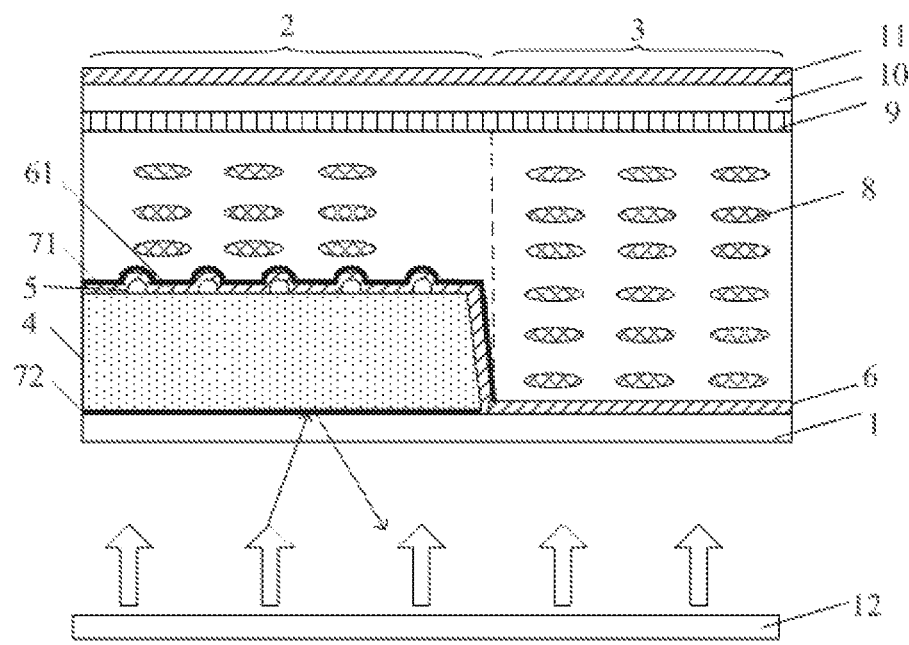
FIG. 6 is a schematic diagram of an inkjet plate for forming dots according to the second embodiment of the present disclosure.

As shown in an optical path diagram of FIG. 6, in the display panel in the present embodiment, light emitted into the transmissive region 3 from the backlight source 12 directly enters the display substrate, and finally implements image display; in the reflective region 2, because the first reflective layer 71 is provided on the first auxiliary polarizer 61, ambient light entering the display panel from outside is not influenced by the backlight source 12, and can normally implement reflective image display; because the second reflective layer 72 is provided below the supplementary layer 4 in the reflective region 2, light emitted into the reflective region 2 from the backlight source 12 is reflected back to the backlight source side by the second reflective layer 72 to be reused.

The present embodiment provides a transflective LCD panel, in which both the transmissive region and the reflective region of each pixel region are provided with a polarizer, and accordingly two reflective layers are provided in the reflective region, so that the light emitted from the backlight source and wasted in the reflective region in the prior art is effectively utilized, and in turn low power consumption of a transflective display panel product is realized, thereby enhancing product competitiveness.

According to the first and second embodiments, in the display panel of the present disclosure, in the reflective region of a pixel region, no polarizer is provided, or reflective layers are provided above and below the polarizer, so that light irradiating into the reflection region from the backlight source does not need to pass a polarizer twice, but is directly reflected back to the backlight source side by a reflective layer for reuse. Therefore, energy of the backlight source can be fully utilized, power consumption can be significantly saved, and product competitiveness of the display panel is enhanced.

The transflective LCD panel in the present disclosure is particularly suitable for high-end intelligent mobile terminal products such as smart wearable devices.

Third Embodiment

The present embodiment provides a display apparatus including the display panel in the first embodiment or the second embodiment.

The display apparatus may be any product or component having a display function such as a liquid crystal panel, an electronic paper, a mobile phone, a tablet computer, a television, a monitor, a notebook computer, a digital photo frame, a navigator, or the like.

The display apparatus has good display effect and low power consumption.

It should be understood that the above implementations are merely exemplary implementations adopted for explaining the principle of the present disclosure, but the present disclosure is not limited thereto. For those skilled in the art, various modifications and improvements may be made without departing from the spirit and essence of the present disclosure, and these modifications and improvements are also considered to be within the protection scope of the present disclosure.

The invention claimed is:

1. A display panel, comprising a backlight source and a display substrate, wherein the display substrate comprises a plurality of pixel regions each comprising a transmissive region and a reflective region, a first polarizer is provided in an area corresponding to the transmissive region and on a surface of the display substrate proximal to the backlight source, the first polarizer extends within the transmissive region only; and a reflective unit is provided in an area corresponding to the reflective region and close to the backlight source, and the reflective unit and the first polarizer are substantially provided in a same layer;
   wherein the reflective unit comprises a reflective layer, and in the reflective region of the display panel, a supplementary layer is provided at a side of the reflective layer distal to the backlight source;
   wherein a substrate is provided at an outmost surface of the display substrate proximal to the backlight source, and the first polarizer is provided on a surface of the substrate distal to the backlight source and corresponding to the transmissive region; and
   a plurality of dots spaced apart from each other and protruding away from the backlight source are provided on an area of the substrate corresponding to the reflective region, the reflective layer is provided on surfaces of the dots distal to the backlight source, and the supplementary layer is provided on a surface of the reflective layer distal to the backlight source.

2. The display panel according to claim 1, wherein the first polarizer is an anisotropic film polarizer formed using an organic dye molecule having polarizing property, or a coated film polarizer formed by adding a dichroic dye to a reactive liquid crystal having anisotropic property.

3. The display panel according to claim 2, wherein the first polarizer is formed using a trisazo dye.

4. The display panel according to claim 2, wherein the first polarizer is formed using a transfer plate or an inkjet printing process.

5. The display panel according to claim 1, wherein the first polarizer is a nanowire grid polarizer.

6. The display panel according to claim 5, wherein the first polarizer is formed using a nanoimprint technique.

7. The display panel according to claim 1, wherein the reflective layer is formed using a material having reflecting property, and the material having reflecting property includes aluminum or silver.

8. The display panel according to claim 1, wherein the display substrate further comprises a second polarizer attached to a surface of the display substrate distal to the backlight source.

9. A display apparatus, comprising the display panel according to claim 1.

10. A display panel, comprising a backlight source and a display substrate, wherein the display substrate comprises a plurality of pixel regions each comprising a transmissive region and a reflective region, a first polarizer is provided in an area corresponding to the transmissive region and on a surface of the display substrate proximal to the backlight source, and the first polarizer further extends to the reflective region to form a first auxiliary polarizer; a reflective unit is provided in an area corresponding to the reflective region and close to the backlight source, and the reflective unit and the first polarizer are substantially provided in a same layer, wherein
- a supplementary layer is provided in the reflective region and on a surface of the first auxiliary polarizer proximal to the backlight source; and
- the reflective unit comprises a first reflective layer and a second reflective layer, the first reflective layer being provided on a surface of the first auxiliary polarizer distal to the backlight source, and the second reflective layer being provided on a surface of the supplementary layer proximal to the backlight source.

11. The display panel according to claim 10, wherein a plurality of dots spaced apart from each other and protruding away from the backlight source are provided on a surface of the supplementary layer distal to the backlight source, and the first auxiliary polarizer is provided on surfaces of the dots distal to the backlight source.

\* \* \* \* \*